United States Patent [19]

Wakuta

[11] Patent Number: 4,538,582

[45] Date of Patent: Sep. 3, 1985

[54] METHOD OF COMBUSTING FUEL IN AN INTERNAL COMBUSTION ENGINE AND ITS APPARATUS

[75] Inventor: Koichi Wakuta, Hamamatsu, Japan

[73] Assignee: Johoku Kigyo Kabushiki Kaisha, Hamamatsu, Japan

[21] Appl. No.: 575,936

[22] Filed: Jan. 31, 1984

[30] Foreign Application Priority Data

Feb. 4, 1983 [JP] Japan .................. 58-16131

[51] Int. Cl.³ .............................................. F02B 75/10
[52] U.S. Cl. ................................... 123/538; 123/536; 210/222
[58] Field of Search ................. 123/536, 537, 538; 210/222

[56] References Cited

U.S. PATENT DOCUMENTS

| | | | |
|---|---|---|---|
| 2,652,925 | 9/1953 | Vermeirer | 210/222 |
| 2,926,276 | 2/1960 | Moriya | 123/536 |
| 3,228,868 | 1/1966 | Ruskin | 210/222 |
| 3,349,354 | 10/1967 | Miyata | 123/538 |
| 3,989,017 | 11/1976 | Reece | 123/538 |
| 4,050,426 | 9/1977 | Sanderson | 123/538 |
| 4,308,844 | 1/1982 | Persinger | 123/537 |
| 4,372,852 | 2/1983 | Kovacs | 210/222 |
| 4,381,754 | 5/1983 | Heckel | 123/538 |
| 4,414,951 | 11/1983 | Saneto | 123/536 |

FOREIGN PATENT DOCUMENTS 1092917  1/1981  Canada ........................ 123/538

*Primary Examiner*—Ronald H. Lazarus
*Attorney, Agent, or Firm*—Wenderoth, Lind & Ponack

[57] ABSTRACT

In combusting fuel in an internal combustion engine with a fuel combustion system having a fuel tank, a fuel injecting system for injecting fuel into a cylinder section and a fuel path for providing fluid communication between the fuel tank and the fuel injecting system, a magnetic field is applied, by means of a magnetic field applying device, to the fuel flowing from the fuel tank to the fuel injecting system through the fuel path. The magnetic field applying device is provided either along the fuel path or in the fuel injecting system.

14 Claims, 5 Drawing Figures

METHOD OF COMBUSTING FUEL IN AN INTERNAL COMBUSTION ENGINE AND ITS APPARATUS

BACKGROUND OF THE INVENTION

1. Field of the Invention

The present invention relates to a method of combusting fuel in an internal combustion engine carried on an automobile, for example, and an apparatus therefor.

2. Brief Description of the Prior Art

The internal combustion engine carried on an automobile, for example, is generally categorized into a spark-ignition type internal combustion engine using gasoline for fuel and a compression-ignition type internal combustion engine using gas oil for fuel.

In these types of the internal combustion engines, a fuel system is provided with merely a fuel filter for filtering fuel passing therethrough between the fuel tank and carburator or the fuel injection system, for fuel combustion enhancing purpose. No other measure than the above has been taken for the same purpose. The recent severe shortage of fuel resources has required fuel saving and resulted in an increase in price for fuel for the internal combustion engine. In this field, therefore, there is a strong demand to reduce fuel consumption.

SUMMARY OF THE INVENTION

Accordingly, an object of the present invention is to provide a method of combusting fuel in an internal combustion engine and an apparatus therefor, which can provide the improved fuel consumption and the reduced fuel consumption by merely providing a magnetic field applying device in the fuel system of the internal combustion engine.

According to one aspect of the present invention, there is provided a method of combusting fuel in an internal combustion engine with a fuel combustion system having fuel supply means, fuel injecting means for injecting fuel into a cylinder section and a fuel path for providing fluid communicating between the fuel supply means and the fuel injecting means, the method comprising the step of applying a magnetic field to fuel flowing from said fuel supply means to said fuel injecting means along the fuel path.

According to another aspect of the invention, there is provided a combustion apparatus for an internal combustion engine having fuel supply means, fuel injecting means for injecting fuel into a cylinder section and a fuel path for providing communication between fluid the fuel supply means and the fuel injecting means, in which the improvement comprises a magnetic field applying device provided in a section containing the fuel path and the fuel injecting means.

BRIEF DESCRIPTION OF THE DRAWINGS

Other objects and features of the invention will be apparent from the following description taken in connection with the accompanying drawings, in which.

DETAILED DESCRIPTION OF THE PREFERRED EMBODIMENTS

Figure 1:
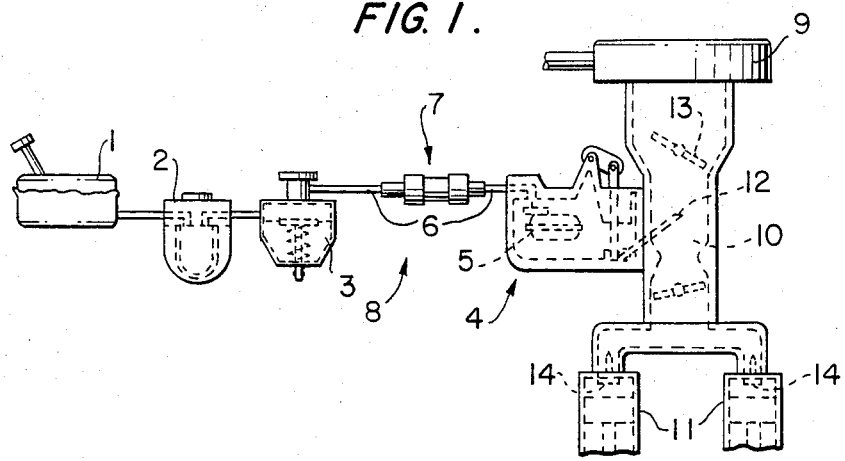
FIG. 1 is a view schematically illustrating a first embodiment of a combustion apparatus according to the present invention.
Figure 2:
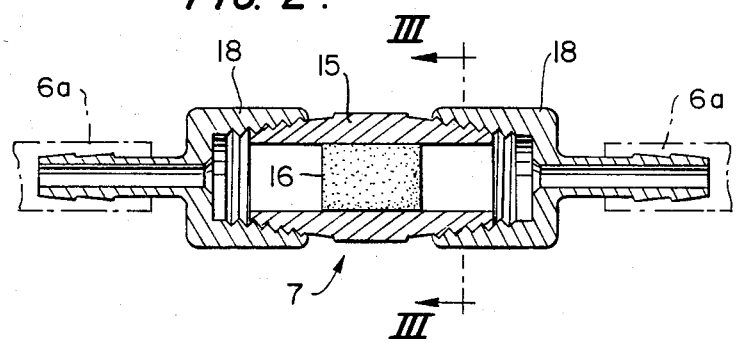
FIG. 2 is a longitudinal sectional view of a magnetic field applying device used in the combustion apparatus shown in FIG. 1.
Figure 3:
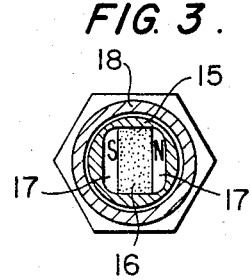
FIG. 3 is a cross-sectional view taken on line III—III of FIG. 2.

Referring to FIGS. 1 to 3, there is shown an embodiment of a combustion apparatus according to the present invention which is incorporated into an internal combustion engine of the spark-ignition type. In FIG. 1, a fuel tank 1 communicates through a fuel filter 2 with a fuel pump 3. The fuel pump 3 is in fluid communication with a float chamber 5 of a carburator 4 via a fuel path 6. A magnetic field applying device 7 is inserted in the fuel path 6 closer to the float chamber 5 of the carburator 4 than to full pump 3. The above components cooperate to form a fuel system 8 in the internal combustion engine.

Also in FIG. 1, an air cleaner 9 is connected to cylinders 11 of the internal combustion engine, via an inlet pipe 10 of the carburator 4. A main nozzle 12 of the carburator 4 opens into a venturi tube portion of the inlet pipe 10. In the figure, reference numeral 13 designates a throttle valve and numeral 14 intake valves.

Turning now to FIGS. 2 and 3, there is shown a structure of the magnetic field applying device 7. As shown, a plate-like permanent magnet 16 is fixedly fit in a tubular yoke 15 at the substantially mid-portion of the yoke. Under this condition, the permanent magnet 16 parts the mid-portion of the hollow space of the yoke 15 laterally into two sections 17, which are respectively defined by the inner wall of the yoke 15 and one of the side surfaces of the permanent magnet 16 and by the inner surface and the other side wall of the permanent magnet 16. Those hollow sections 17, shaped like trapezoid as viewed in the cross section, serve as fuel paths. For mounting the magnetic field applying device 7 to the fuel system 8, two mouth-pieces 18, which are respectively fit into fuel pipes 6a of the fuel path 6, are respectively fixed to, for example, screwed around, opposite ends of yoke 15. The yoke 15 is made of magnetic metal such as iron. The mouthpieces 18 are made of nonmagnetic material, such as brass. The permanent magnet 16 is preferably made of material providing a high flux density, viz. with a rectangular magnetizing curve and a large coersive force, such as a rare earth magnet or a cobalt magnet. For example, a Rarenet (trade name) commercially available, is preferable for the permanent magnet 16 in this embodiment.

In the above embodiment, the permanent magnet 16 is used as a magnetic source. This may be replaced by any other suitable device if it can apply a maximum of magnetic field to the flowing fuel. For example, a couple of plate-like permanent magnets can be successively arranged in and along the yoke in a manner such that one is rotated 90° from the other in the circumferential direction of the yoke. This modification can apply a magnetic field to the flowing fluid over a longer distance. Further, the magnetic flux passing the flowing fluid may be developed electrically in a manner that a nonmagnetic tubular member shaped like the yoke 15 is provided with a coil wound therearound. In this case, the magnetic field applying device 7 must be structured so that a maximum of magnetic flux passes through the flowing fluid by using a well known technique in the field. In any case, the structure essential to this magnetic field applying device 7 is able to apply maximumly and uniformly a magnetic field to the flowing fluid.

Optionally, the yoke 15 may be covered with a non-magnetic tube, for protecting the yoke 15 from dust or damage. Additionally, pole pieces may be mounted to both sides of the permanent magnet 16.

For ease of installing the magnetic field applying device 7, it is preferable to set it close to and upstream of the carburator 4. With such an installation of the magnetic field applying device 7, it can easily be installed in an conventional fuel system of an internal combustion engine. Alternatively, the magnetic field applying device 7 is provided in a main fuel path between the float chamber 5 and the main nozzle 12 in the carburator 4.

Figure 4:
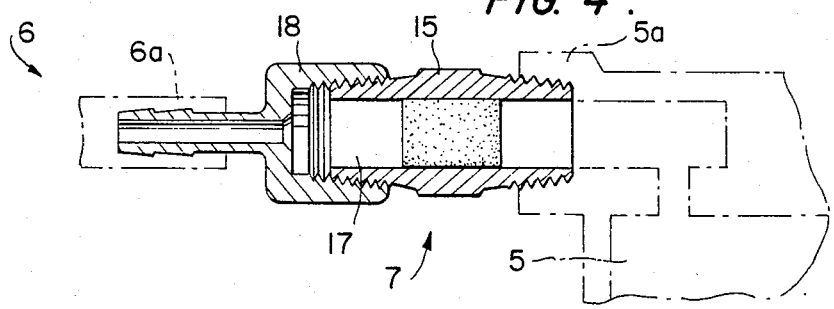
FIG. 4 is a partial longitudinal sectional view of another magnetic field applying device.

In FIG. 4, there is shown a modification of the magnetic field applying device 7 so structured as to be convenient when it is installed closest to the carburator 4. As shown, one of the mouth-pieces 18 of the magnetic field applying device 7 is omitted. The screwed end of the yoke 15, where otherwise the omitted mouth-piece would be screwed thereto, is directly coupled with, for example, screwed into, the flow chamber wall 5a of the carburator 4, thereby to make the fuel path in the yoke 15 communicate directly with the float chamber 5 by way of a float valve. In the figure, like reference numerals are used to designate like portions in FIGS. 2 and 3.

In operation, with a negative pressure generated by the action of the cylinders 11 when the internal combustion engine runs, fresh air is taken in through the air cleaner 9 and the inlet pipe 10. At the same time, gasoline as fuel from the float chamber 5 of the carburator 4 is jetted by the main nozzle 12 and blended with the air so taken in to form a air-fuel mixture. The mixture is fed into the cylinders 11 when the intake valves 14 are open. In the cylinders 11, the mixture is ignited by an ignition plug (not shown) and combusted. The above process is the same as that of the conventional internal combustion engine of this type. With the drop in the level of the gasoline in the float chamber 5 due to its consumption as the engine runs, gasoline in the fuel tank 1, after being filtered by the fuel filter 2, is fed, by the fuel pump 3, into the float chamber 5 through a float valve (not shown), thereby to keep the gasoline at a fixed level in the flat chamber 5. The magnetic field applying device 7 provided between the fuel pump 3 and the float chamber 5 applies a magnetic field to the gasoline flowing through the fuel paths 17. At this time, a magnetic field of approximately 2000 to 10,000 Gauss flux density is applied, by the permanent magnet 16, to the flowing gasoline in such a way that the direction of the magnetic field is substantially orthogonal to the flow of the gasoline. Then, the gasoline is led to the float chamber 5 and to the cylinders 11 for combustion.

In experiments conducted by the inventor of the present invention, the same automobile (Toyota Mark II) was comparatively operated using the mixture based on gasoline flowing along the paths 17 of the magnet device 7 so as to be subjected to a magnetic field of about 4000 Gauss, and the mixture based on gasoline not subjected to such a magnetic field. When using the magnetic field applied fuel, the specific fuel consumption for the ordinary running of the car was 3 to 5% higher than that when using the ordinary fuel not subjected to the magnetic field. Further, in the case of using the magnetic field applied fuel, the stain of the electrode part of the ignition plug after three months with approximately 5,500 Km run of the car was remarkably less. This implies that the fuel is well combusted. Additionally, the idling speed when the magnetic field applied fuel was used was about 10% higher than that when the ordinary fuel was used. An improvement in acceleration in the former case was also confirmed.

Figure 5:
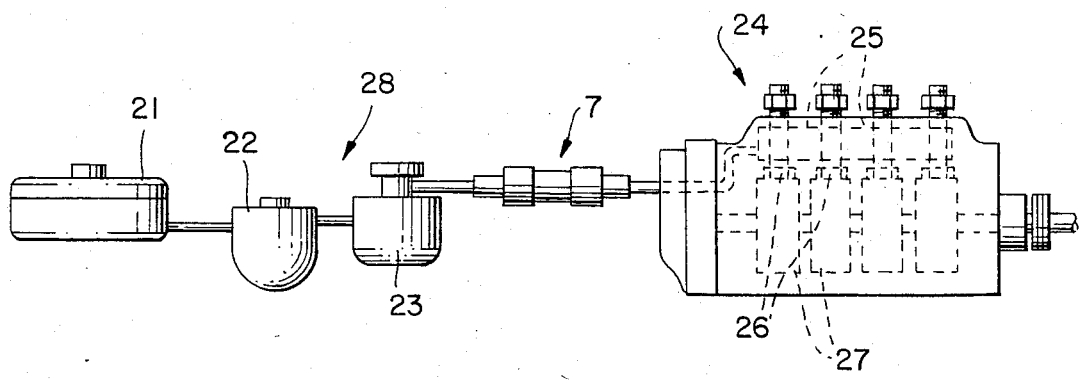
FIG. 5 is a view schematically illustrating a second embodiment of a combustion apparatus according to the present invention.

Turning now to FIG. 5, there is shown another embodiment of a combustion apparatus according to the present invention which is incorporated into a compression-ignition engine, or a Diesel engine, of an automobile. As shown, a fuel tank 21 communicates with a fuel injection pump 25 of a fuel injection system 24, via a fuel filter 22 nd a fuel pump 23. The fuel injection pump 25 further communicates with cylinders 27 through an injection valve 26. A magnetic field applying device 7 structurally similar to the of FIG. 3 is provided on the intake side of the fuel injection pump 25. The above components constitute a fuel system 28.

For combusting gas oil by the combustion apparatus thus arranged, when the Diesel engine is running, gas oil pumped from the fuel tank 21 into the oil pipe connected thereto by the fuel pump 23 and is filtered by the fuel filter 22. The filtered fuel is subjected to a magnetic field developed by the magnetic field applying device 7 before it enters the fuel injection values 26 which cooperate to jet the magnetic field applied fuel into the cylinders 27 where it, together with air introduced thereinto, is compressed and ignited.

An experiment conducted under the same conditions as those in the above experiments for the spark-ignition type engine, also showed that the specific fuel consumption for the ordinary running of the car when the magnetic field applied fuel is used is improved over that when the ordinary fuel is used.

Also in this embodiment, if the magnetic field applying device 7 is located upstream and closer to the fuel injection pump 25, the useful effects mentioned above may be obtained. Further, the magnetic field applying device 7 may be located in each of the fuel paths continuous to cylinders in the fuel injection system.

As seen from the foregoing description, in a method of combusting fuel in an internal combustion engine according to the present invention, fuel such as gasoline or gas oil flowing through a fuel system is subjected to a magnetic field and then is combusted. The fuel combustion in the engine goes well. This leads to fuel saving, and in a broad sense, resource saving, and futher less stain on the electrode of the ignition plug even after a long period of use.

A combustion apparatus for an internal combustion engine according to the present invention has a structural feature that the magnetic field applying device is provided between the fuel tank and the carburator or the fuel injection system, or is provided in the carburator or the fuel injection system. The combusting method can easily be executed with a simple construction and, if the invention is applied to the conventional combustion engine, requires merely a minor modification of the engine.

While the present invention has been described using specific embodiments, it should be understood that the present invention may be variously changed within the scope of the invention. The present invention is applicable not only for the above mentioned two types of internal combustion engine, but also for general purpose engines, motorcycles engines, motor boat engines, etc. In the application of the present invention, there is no limitation as to ignition type, the number of strokes in the engine cycle or the number of cylinders. It is evident that the present invention is also applicable for an internal combustion engine which uses heavy oil for fuel such as the marine engine.

What is claimed is:

1. In an internal combustion engine having a cylinder section, a fuel supply, means for injecting fuel from said fuel supply into said cylinder section for combustion therein, and means for directing fuel along a path from said fuel supply to said injecting means, the improvement comprising means for applying a strong magnetic field to the fuel at a location in one of a segment of said path and said fuel injecting means, said magnetic field applying means including a tubular ferromagnetic yoke and a first plate-shaped permanent magnet disposed in said yoke so as to define fuel flow passages on respective opposite sides of said first magnet between the opposite side faces of said first magnet and the inner walls of said yoke, said first magnet having its north and south poles at said respective side faces, so that the fuel flows through said fuel flow passages to be subjected to a strong magnetic field therealong the fuel flow through one of said fuel flow passages being subjected only to a northern magnetic field and the other fuel flow through the other fuel flow passage being subjected only to a southern magnetic field.

2. The improvement as in claim 1, wherein the cross sections of said fuel flow passages are trapezoidal.

3. The improvement as in claim 1, further comprising a second plate-shaped permanent magnet in said yoke downstream of said first magnet, rotated 90° about the axis of said yoke relative to said first magnet.

4. The improvement as in claim 1, further comprising a fuel pump in said path between said fuel supply and said injecting means, said ferromagnetic yoke being located in said path between said injecting means and said pump, closer to said injecting means than to said pump.

5. The improvement as in claim 4, wherein said fuel directing means includes a first pipe connected at one end thereof to said fuel pump and a second pipe connected at one end thereof to said injecting means, said magnetic field applying means further comprising nonmagnetic connector members screwably connecting opposite ends of said yoke to the other ends of said first and second pipes.

6. The improvement as in claim 4, wherein said internal combustion engine includes a carburator having a float chamber, said yoke being directly screwably connected at one end thereof to said float chamber, said fuel directing means including a first pipe connected at one end thereof to said fuel pump, said magnetic field applying means further comprising a nonmagnetic connector member screwably connecting the other end of said first pipe to said yoke.

7. The improvement as in claim 1, in which said magnetic field applying means are respectively provided in fuel paths continuous to cylinders in said fuel injection system.

8. The improvement as in claim 1, in which said fuel injecting means is a carburator.

9. The improvement as in claim 8, in which said magnetic field applying means is provided in said fuel path upstream of said carburator.

10. The improvement as in claim 8, in which said magnetic field applying means is provided in a main fuel path between a float chamber and a main nozzle in said carburator.

11. The improvement as in claim 1, in which said permanent magnet is made of material mainly containing rare earth elements.

12. The improvement as in claim 2, in which said permanent magnet is made of material mainly containing rare earth elements.

13. The improvement as in claim 7, in which said fuel injecting means is a fuel injection system.

14. The improvement as in claim 13, in which said magnetic field applying means is provided in said fuel path upstream said fuel injection system.

* * * * *